(No Model.)
W. H. STARR.
MOTOR.
No. 503,623. Patented Aug. 22, 1893.
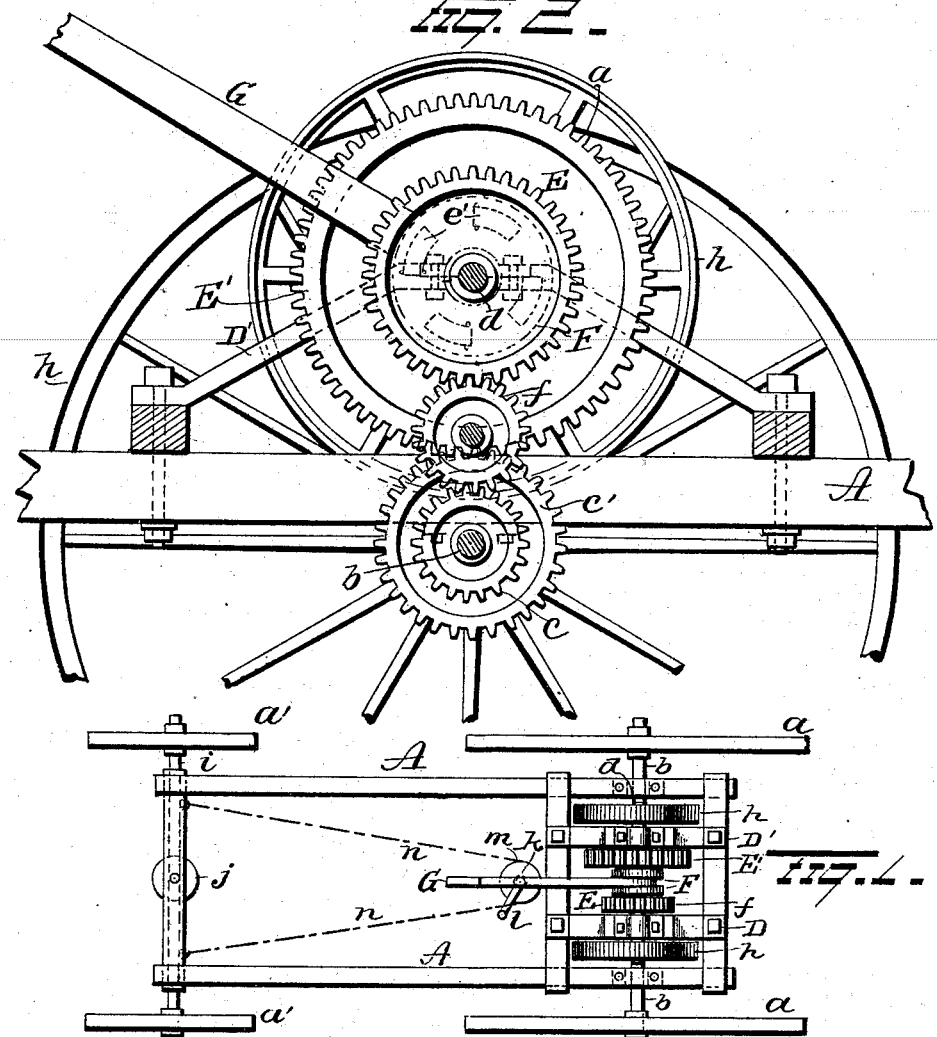
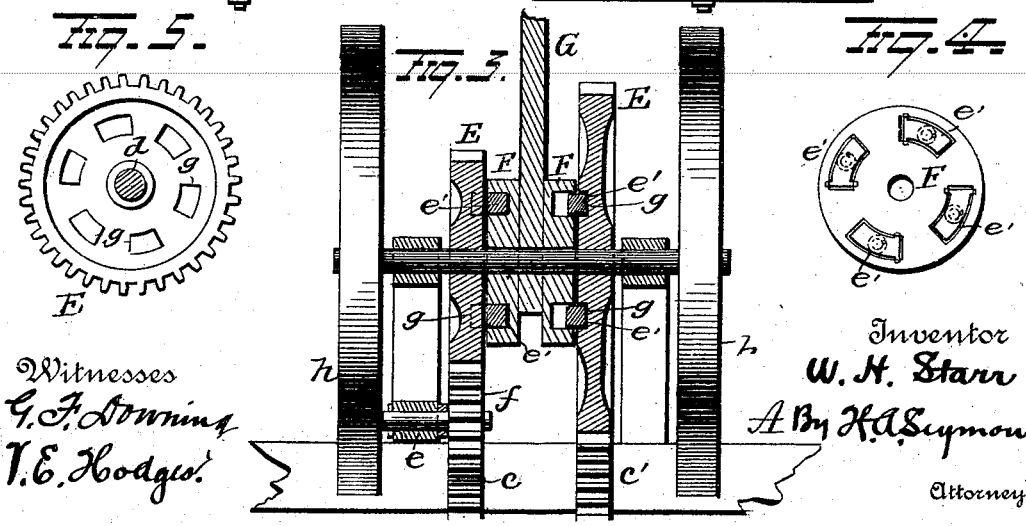
Witnesses
G. F. Downing
T. E. Hodges
Inventor
W. H. Starr
By H. A. Seymour
Attorney

UNITED STATES PATENT OFFICE.

WILLIAM H. STARR, OF LIBERTY, NEBRASKA.

MOTOR.

SPECIFICATION forming part of Letters Patent No. 503,623, dated August 22, 1893.

Application filed February 9, 1893. Serial No. 461,655. (No model.)

*To all whom it may concern:*

Be it known that I, WILLIAM H. STARR, a resident of Liberty, in the county of Gage and State of Nebraska, have invented certain new and useful Improvements in Motors; and I do hereby declare the following to be a full, clear, and exact description of the invention, such as will enable others skilled in the art to which it appertains to make and use the same.

My invention relates to an improvement in motors, the object being to provide a device which shall be simple in construction, cheap to manufacture and which can readily be used for imparting rotary motion to the wheels of a vehicle or to machinery.

With these objects in view the invention consists in certain novel features of construction and combinations and arrangements of parts as hereinafter set forth and pointed out in the claims.

In the accompanying drawings: Figure 1 is a plan view of a vehicle embodying my improvements. Fig. 2 is a sectional view. Fig. 3 is a sectional view of the clutch mechanism. Figs. 4 and 5 are detail views.

While my improved motor is applicable for driving various kinds of devices, I will, for convenience, describe it herein as applied for driving a vehicle.

A represents a vehicle frame, having front wheels $a$ and rear wheels $a'$. On the axle $b$ of the front wheels, two gear wheels $c$, $c'$ are rigidly secured.

Secured to and projecting upwardly from the frame of the vehicle are two brackets D, D', in which a shaft $d$ is mounted, and on said shaft $d$, two gear wheels E, E' are loosely mounted,—the gear wheel E being smaller than the gear wheel E', and the latter being adapted to mesh with the gear wheel $c'$.

Secured to the bracket D, is a box or frame $e$, which supports a gear wheel or pinion $f$. This pinion is adapted to mesh with the gear wheel E, and also with the gear wheel $c$ on the front axle. The gear wheels E, E', are provided in their inner faces with recesses $g$ for the reception of a series of spring actuated dogs $e'$ carried by two disks F, F', secured to the shaft $d$. The dogs $e'$ are located loosely in recesses in the disks F, F', said dogs being adapted to engage in the notches $g$ in the driving pinions E, E', when the disks are oscillated in one direction and to ride over said recesses or notches when the disks are oscillated in the reverse direction. An operating lever G is inserted between the disks F, F', and secured thereto in any suitable manner, so that said disks will be oscillated when the lever G is vibrated. Balance wheels $h$ are secured to the shaft $d$ in proximity to the driving pinions E, E', and serve to assist the operator in manipulating the lever G. From this construction and arrangement of parts, it will be seen that when the lever G is vibrated in one direction, the dogs carried by one of the disks will engage the notches or recesses $g$ of one of the gear wheels E or E', and cause said wheel to make a partial revolution, while the dogs of the other disk will ride over the recesses of the other driving pinion, without imparting motion to it, and vice versa. When the gear wheel E' is rotated motion will be imparted to the gear wheel $c'$ on the axle $b$, and thus propel the vehicle forward. When the gear wheel E is rotated by the reverse vibration of the lever G, motion will be imparted to the gear wheel or pinion $f$ and from said pinion to the gear wheel or pinion $c$ on the axle $b$ and thus continue the forward motion of the vehicle. Thus it will be observed that by the forward and backward vibration of the lever, a continuous motion will be imparted to the wheels of the vehicle or other device to be propelled.

The rear axle $i$ of the vehicle is pivotally connected with the vehicle frame by means of a fifth wheel $j$. A vertical shaft $k$ is located in proximity to the front end of the vehicle and provided with a crank arm $l$ by means of which to operate it. A wheel (preferably a sprocket wheel) $m$ is carried by the vertical shaft $k$, and over this wheel a chain $n$ passes, the ends of said chain being connected with the rear axle $i$. By this means the vehicle can be readily guided.

Slight changes in the details of construction of my invention might be made without departing from the spirit of the invention or limiting its scope, and hence I do not wish to limit myself to the precise details of construction herein set forth; but Having fully described my invention, what I claim as new, and desire to secure by Letters Patent, is—

1. The combination with a shaft, of gear wheels mounted loosely on said shaft and having recesses in their inner faces, disks secured to said shaft between the gear wheels, dogs carried by said disks and adapted to alternately engage the recesses in the gear wheels when the disks are moved in one direction and alternately ride over them when the disks are moved in the other direction, an axle, gear wheels carried by said axle, one of said gear wheels being adapted to mesh with one of the loosely mounted gear wheels, and a pinion located between the other gear wheel on the axle and other loosely mounted gear wheel, and a lever secured to said disks, substantially as set forth.

2. The combination with a shaft, of gear wheels mounted loosely on said shaft and having recesses in their inner faces, balance wheels secured to said shaft, disks secured to said shaft between the gear wheels, an operating lever secured to said disks, dogs carried by each of said disks, the dogs of each disk being adapted to engage the recesses in the respective gear wheels, alternately when the disks are moved in one direction and ride over them alternately when the disks are moved in the other direction, a pinion meshing with one of said loosely mounted gear wheels, an axle carrying a gear wheel with which said pinion meshes, and another gear wheel on said axle adapted to mesh with the other loosely mounted gear wheel, substantially as set forth.

In testimony whereof I have signed this specification in the presence of two subscribing witnesses.

WILLIAM H. STARR.

Witnesses:
W. T. GORE,
D. T. GORE.